United States Patent [19]

Karlsson

[11] 4,146,063
[45] Mar. 27, 1979

[54] METHOD FOR FILLING OF TUBE ELECTRODES

[75] Inventor: Rune Karlsson, Nol, Sweden

[73] Assignee: Aktiebolaget Tudor, Sundbyberg, Sweden

[21] Appl. No.: 797,680

[22] Filed: May 17, 1977

[30] Foreign Application Priority Data

May 24, 1976 [SE] Sweden ................................ 7605843

[51] Int. Cl.² .............................................. B65B 3/10
[52] U.S. Cl. ........................................ 141/1.1; 141/34
[58] Field of Search ..................... 29/623.1; 137/262; 141/1, 1.1, 11, 32, 33, 34, 283, 324; 210/78; 252/182.1

[56] References Cited

U.S. PATENT DOCUMENTS

| | | | |
|---|---|---|---|
| 1,156,316 | 10/1915 | Rowley | 141/1.1 |
| 1,669,696 | 3/1920 | Fraass | 141/34 |
| 2,422,437 | 6/1947 | Plews | 141/1.1 |
| 3,885,988 | 5/1975 | Bohle | 141/1.1 |

*Primary Examiner*—Richard E. Aegerter
*Assistant Examiner*—Frederick R. Schmidt
*Attorney, Agent, or Firm*—Burns, Doane, Swecker & Mathis

[57] ABSTRACT

An improved method for the filling of porous tube electrodes for electric accumulator batteries is disclosed. A paste of the active material and a liquid (e.g., water) is formed and a small amount of surplus liquid is added. The tubes are filled with resulting paste by centrifugation with the surplus liquid being removed through the tubes during filling.

8 Claims, No Drawings

METHOD FOR FILLING OF TUBE ELECTRODES

BACKGROUND OF THE INVENTION

The present invention concerns a process for the filling of tube electrodes for electrical accumulator batteries. More particularly, the process concerns wet filling of tube electrodes in which the active material is mixed with water and other liquids to form a paste. The process of the present invention is designed especially for use in connection with the production of positive tube electrodes for lead accumulator batteries. Electrodes for lead accumulator batteries and other conventional accumulator types are constructed around a frame or plate, the so-called grid, of electrically-conducting material which is wholly or partly surrounded by active material consisting of a porous structure of a metal or an organo-metallic compound. In lead electrodes the grid consists of a suitable lead-base alloy, and the active material of the positive electrode consists of lead oxides, primarily lead dioxide, when charged and of lead sulfate when discharged.

The positive electrodes are suitably produced as tube electrodes. Each such electrode comprises a number (generally 15 to 20) of tubes. Each tube, which often has a diameter of 5–10 mm, consists of an electrolytically pervious, resistant material, e.g., glass fiber. In the center of each tube there is a bar, i.e., a rod of suitable lead-base alloy, surrounded by active material which is held fast by the tube sheath. At this lower end the tubes are jointly compacted with the help of a so-called bottom strip and at the top with the help of an upper border, which consists of the same alloy as the rods and is electrically connected with the latter.

In the production of positive lead electrodes, a grid comprising the rods and upper border is first cast. The tube sheaths are drawn onto this grid, whereupon the active material is supplied conventionally in the form of dry powder, consisting chiefly of lead oxide. In order to obtain a complete filling and a consolidation of the active material, the electrodes are vibrated during the filling process.

The handling of the dry powder and especially the vibration causes the formation of a considerable amount of dust including lead dust. Because of the poisonous quality of the material, this leads to great inconvenience in connection with the filling of the electrodes. The loss of material, moreover, becomes unnecessarily great. In order to avoid these inconveniences to some degree, it has been suggested to use centrifugation instead of vibration. In this way, vibrating is avoided, but the disadvantages in connection with the handling of a dry powder remain. Special measures must also be taken in order to safeguard the powder delivery in connection with the centrifugation, and it has been suggested that the supply arrangements be worked out in such a way that the lead oxide dust be conveyed to the electrodes from a fluidized bed.

In order to avoid the disadvantages connected with the handling of the powder, several wet-filled methods have been suggested. The common feature of these methods is that the completely mixed paste of active material and water is pressed into the electrodes under high pressure. In order to overcome the pressure drop in the relatively long and narrow tubes, high pressure is required. Usually, a certain amount of surplus liquid is added in order to reduce the viscosity of the paste. The surplus liquid, which must flow out through the tube walls during application of the high pressure, carries along a not insignificant amount of small lead particles. There are several undesirable consequences: a size fractionation of the material, a considerable dirtying of the outer side of the electrodes, and problems in connection with the managing of the lead-contaminated waste water. To avoid these problems it has been suggested to impregnate the tube sheaths with a sealing or proofing compound before filling. The sealing compound selected should be soluble in water or sulfuric acid and is removed by washing of the electrodes after filling. However, this requires a reduction of the liquid addition to the paste, which makes necessary an even greater pressure for the introduction of the paste in the electrodes.

OBJECTS AND SUMMARY OF THE INVENTION

It is an object of this invention to provide an improved method for the filling of tube electrodes for electric accumulator batteries which obviates or substantially minimizes the problems of the prior art.

It is further an object of this invention to provide an improved method for the wet filling of tube electrodes for electric accumulator batteries.

It is also an object of this invention to provide an improved method for the wet filling of tube electrodes for electric accumulator batteries which minimizes the loss of active material during filling and the problems related thereto.

In one aspect, the present invention provides an improved method for filling porous sheaths of tubular electrodes for electric accumulator batteries which comprises
   mixing filling material and water to form a paste;
   filling said porous sheaths with said paste by centrifugation, at least a portion of the water in the paste being removed through said sheath during filling.

In another aspect, the present invention provides a process for filling porous sheaths of tubular electrodes for electric accumulator batteries, the improvement comprising filling said sheaths with a paste of the filling material and water, said filling being carried out by centrifugal action whereby said paste fills said tubes and at least some of the water is removed through the sheaths during filling.

DETAILED DESCRIPTION OF THE INVENTION

With the wet filling method according to the present invention the general advantages of wet filling mentioned above are achieved and the drawbacks connected with the known methods are avoided or substantially minimized. With the method of the present invention, a paste of the filling material with a certain amount of surplus liquid is employed, so that the viscosity of the paste permits the introduction of the paste in the electrode sheaths without the operation of excessively high pressures. With the process according to the invention, the imposition of an outer pressure is likewise avoided. The maximum pressure in the paste during the filling is the pressure which can arise on the basis of different centrifugal force on different particles in the paste or on the basis of the paste's friction against the tube sheath and rod. For these reasons the pressure within the paste becomes essentially lower than in the case of previously known wet filling methods. Because of this, the surplus liquid is removed through the porous tube wall and only a very small amount of the lead dust passes off with the liquid. These amounts of dust are quite negligible, and there is no fractionating of the active material in the electrode. The process according to the invention is accompanied by additional advantages, as, e.g., more uniform work operations, as the mixing process hitherto employed for so-called greased or oiled electrodes can also be adopted for the filling of tube electrodes according to this invention. It also becomes possible to control the amount of active material per unit of volume added in each sheath as well as obtain an even distribution of filling process of the present invention, filling can also be combined with other operations. For example, by mixing a suitable amount of sulfuric acid in the paste, one can obtain sulfation of the active material. Formerly, sulfation of tube electrodes filled with dry dust had to be carried out as a separate operation after the filling. The present invention, including sulfation, is a labor-saving device, and also achieves a more uniform product, as the sulfation does not depend on the diffusion process, which is the case with sulfation by dipping in sulfuric acid as in the known processes. Other liquids may also be used for the mixing of the paste, e.g., water solutions of sodium sulfate and sodium hydroxide.

In the process of the present invention, a paste is formed of the filling material (which generally is a mixture of lead and lead oxides as is conventional in the art) and liquid in a manner similar to that already known except that surplus liquid (that is, an excess of that necessary to form a paste) is utilized. Generally, the surplus liquid is present in an amount of up to about 5 parts by weight of the total liquid content of the paste, which total liquid content is generally up to about 25 parts by weight per 100 parts by weight of filling material.

Generally, the paste is first formed of the active material and sufficient liquid to form the paste and the surplus liquid is thereafter added to the paste.

While the liquid utilized in forming the paste is usually water, the water, as noted above, can also contain sulfuric acid or sodium sulfate and sodium hydroxide.

The excess-liquid containing paste is added to a centrifuge in which the porous tube electrode sheath is positioned and the sheath is filled by centrifugation of the paste. During filling, liquid is emitted from the porous sheaths in an amount corresponding substantially to the amount of surplus liquid added to the paste. Very little of the filling material is carried off with the emitted liquid thus obviating disposal problems as well as problems caused by removal of the finely sized fraction of the filling material.

Centrifugation may be accomplished using any suitable centrifugal filling apparatus. It has been found that the time and speed of centrifugation depends on several factors. Complete filling of the electrodes is achieved with centrifugation times that do not surpass 40 seconds per 500 mm of tube length. The distance from the rotation center of the centrifuge to the part of the electrode closest to it generally can be from about 300 to 500 mm, and it has been found that rotation speeds up to 420 rpm are sufficient. The lowest linear speed of any part of the tube sheath during centrifugation is about 5 meters per second. Generally, the acceleration time amounts to about 50% or less of the total centrifugation time.

The invention is additionally illustrated in connection with the following Examples which are to be considered as illustrative of the present invention. It should be understood, however, that the invention is not limited to the specific details of the Examples.

EXAMPLE 1

100 kg of red lead were mixed with 11 kg of distilled water and 12 kg of sulfuric acid (specific weight 1.40). By means of this mixing process, which was carried out with conventional equipment, a so-called grease or lubricant of a conventional paste composition was obtained. After cooling off, 100 kg of the above-mentioned paste composition was mixed with surplus water in the amount of 4.2 kg of distilled water, whereby a paste suitable for wet filling was obtained. Immediately before the filling in the electrodes, the paste was subjected to intensive stirring in order to break up possible lumps. The tube electrode piece, i.e., the grid with threaded-on sheath was thereupon placed in a centrifuge. The distance from the rotation center to the open tube end was about 500 mm and the length of the tube was about 400 mm. The electrode piece or substance was placed in a holder in a horizontal position. A suitable amount of the above-mentioned paste was added and the centrifuge was started. The total centrifugation time was about 35 seconds, and the maximum centrifugation speed was about 315 revolutions per minute. The acceleration required 10 to 15 seconds. In this experiment thirty electrodes were produced, each one of which contained 1.4 kg of wet active material. The variations in the amount of material in the different electrodes amounted to less than 0.5%. With the centrifugation an amount of water was emitted from the electrodes corresponding to the amount (4.2 kg) which was added directly before the tube filling, and the composition of the wet active material in the filled electrodes thus corresponds to the composition of the mix prepared the day before the experiment. The viscosity of the paste used for the filling of the electrodes was measured by a viscosimeter of the Hake-Roto-visco type and provided with a spindle with the designation MV III. The maximum cutting speed or shearing rate it was possible to apply was 12 seconds. When this speed was exceeded, water was given off with the assembly, and there developed a lubrication or greasing between the test material and the test spindle. The measurements yielded the following values:

| Rev. per min. | $\gamma$ (sec$^{-1}$) | $\eta$, cp |
| --- | --- | --- |
| 3 | 1.353 | 4570 |
| 6 | 2.667 | 4000 |
| 9 | 4 | 3370 |
| 18 | 8 | 2860 |
| 27 | 12 | 2450 |
| 18 | 8 | 2700 |
| 9 | 4 | 2200 |
| 6 | 2.667 | 3430 |
| 3 | 1.333 | 4060 |

EXAMPLE 2

A number of electrodes were produced in the manner described above in Example 1. Two electrodes were then taken out for a closer study of the distribution of the active material within the electrodes. The distribution was studied partly in different tubes in the electrode and partly on four different levels in each tube. Each electrode had 19 tubes, and the material distribution was studied in tubes nos. 3, 8, 13, and 18, counting from the side where the solder tag has been placed on the upper frame. The average material amount for all saturation points amounted to 4.05 g/cm$^3$. The mean values for different levels varied between 3.94 and 4.24 g/m³, while the mean values for different tubes varied between 4.03 and 4.08 g/cm³. These values reveal a very good uniformity among the various tubes and fully satisfactory uniformity among the various levels in the tubes. Trial cells for capacity testing were then constructed by means of the electrodes from this production. The trial cells constructed using the electrodes produced according to the present invention showed a capacity that greatly exceeded the nominal capacity prevailing for the cells.

The principles, preferred embodiments and modes of operation of the present invention have been described in the foregoing specification. The invention which is intended to be protected herein, however, is not to be construed as limited to the particular forms disclosed since these are to be regarded as illustrative rather than restrictive. Variations and changes may be made by those skilled in the art without departing from the spirit of the invention.

What is claimed:

1. An improved method for filling porous sheaths of tubular electrodes for electric accumulator batteries which comprises:

mixing filling material and excess water to form a paste, the excess water surplus comprising up to about 5 parts by weight of the total liquid content of the paste and up to about one-fifth of the amount of water in the paste;

filling said porous sheaths with said paste by centrifugation, at least the excess water in the paste being removed through said sheath during filling.

2. The process of claim 1 wherein the paste contains about 25 parts by weight of water per one hundred parts by weight of active material.

3. The process of claim 2 wherein the active material comprises lead or lead oxides or mixtures thereof.

4. The process of claim 2 wherein the viscosity of the paste is at least about 2500 cp with a maximum shearing rate of 8 $s^{-1}$.

5. The process of claim 1 wherein the lowest linear speed attained by any part of the tube sheath during centrifugation is about 5 m/s.

6. The process of claim 5 wherein the time for acceleration during centrifugation amounts to about 50% of the total centrifugation time.

7. The process of claim 1 wherein the sheath is centrifuged with the maximum number of revolutions of 7 revolutions per second.

8. The process of claim 1 wherein the total time of centrifugation does not exceed 40 seconds per 500 mm of tube length.

* * * * *